United States Patent [19]
Erickson et al.

[11] 4,002,094
[45] Jan. 11, 1977

[54] METAL SAW

[75] Inventors: Harold L. Erickson, Salida; Wayne S. Weaver, Denver, both of Colo.

[73] Assignee: Quick Rip Corporation, Littleton, Colo.

[22] Filed: Aug. 11, 1975

[21] Appl. No.: 603,268

[52] U.S. Cl. .............................. 83/471.3; 83/477.1; 83/477.2; 83/581
[51] Int. Cl.² ....................... B27B 5/20; B27B 5/26
[58] Field of Search ............ 83/471.3, 477.1, 477.2, 83/581

[56] References Cited

UNITED STATES PATENTS

| | | | |
|---|---|---|---|
| 1,584,086 | 5/1926 | Fonda | 83/471.3 |
| 2,208,582 | 7/1940 | Hollister | 83/471.3 |
| 3,623,516 | 11/1971 | Kirk | 83/581 X |
| 3,672,251 | 6/1972 | Jagers | 83/581 X |

*Primary Examiner*—Willie G. Abercrombie
*Attorney, Agent, or Firm*—Van Valkenburgh and Lowe

[57] ABSTRACT

A metal saw is mounted upon a tippable arm above a table and is lowered to cut a work piece on the table. The saw and the tippable frame supporting it are mounted upon a vertically axised swing arm which has its vertical axis extending upwardly through the table in the plane of the saw blade and adjacent to the saw shaft. The tippable arm and the swing arm are laterally offset from the plane of the blade to permit the blade to be swung from a normal crosscut position perpendicular to a longitudinal edge of the table to selected angular positions and to a ripping position parallel to the edge of the table. The portion of the table immediately below the saw blade is formed as a disc which includes a slot wherein the edge of the saw may drop and which is axised to the swing arm to rotate with the swing arm and saw.

5 Claims, 12 Drawing Figures

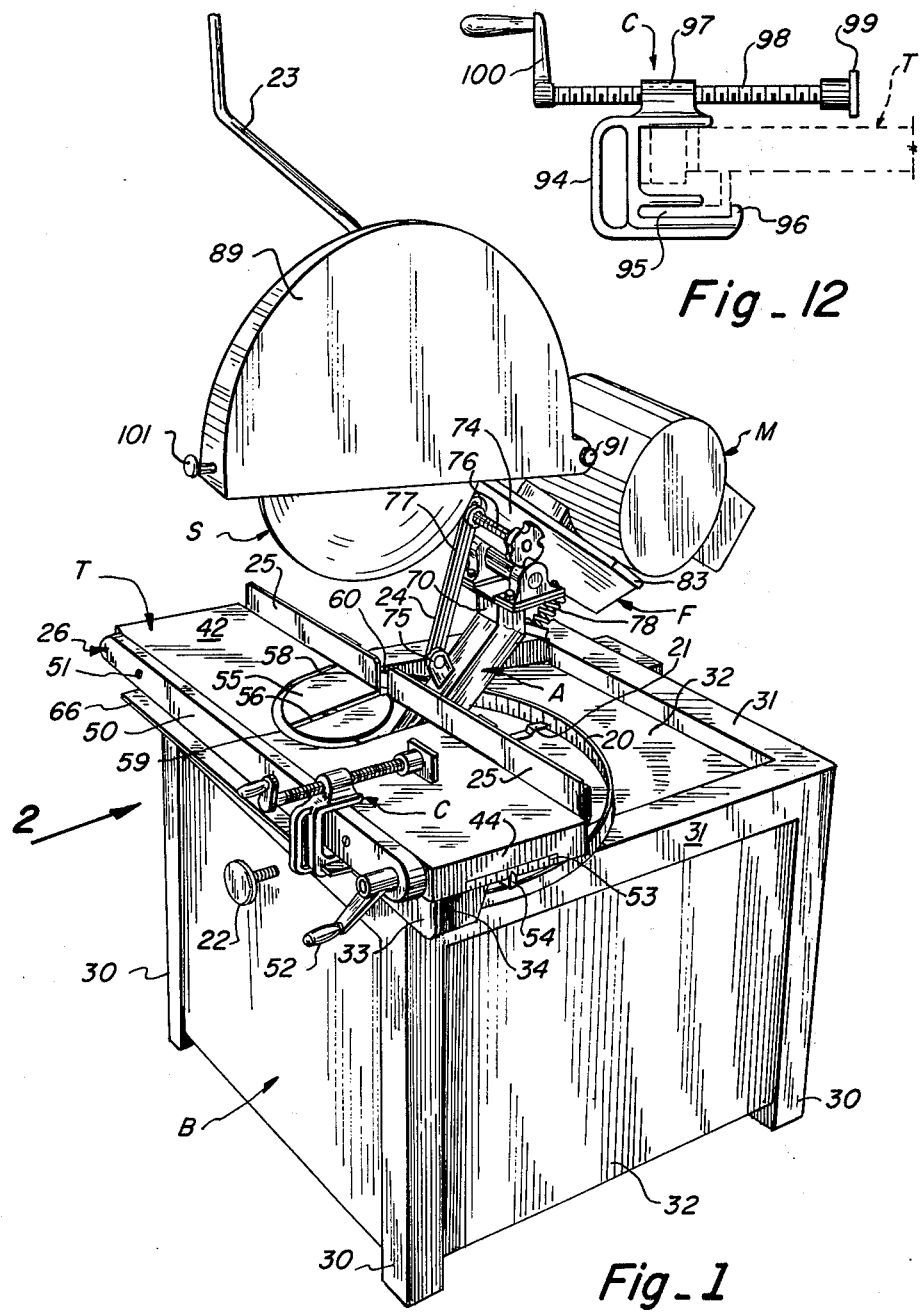
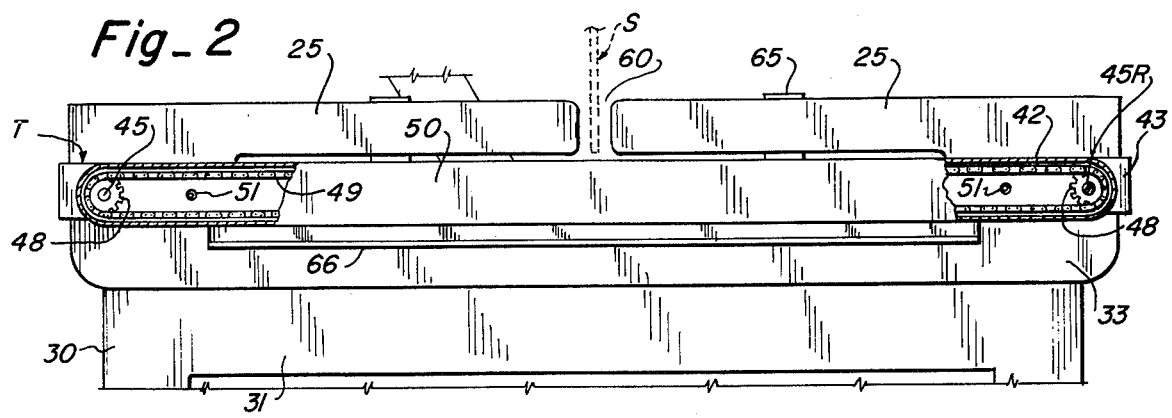

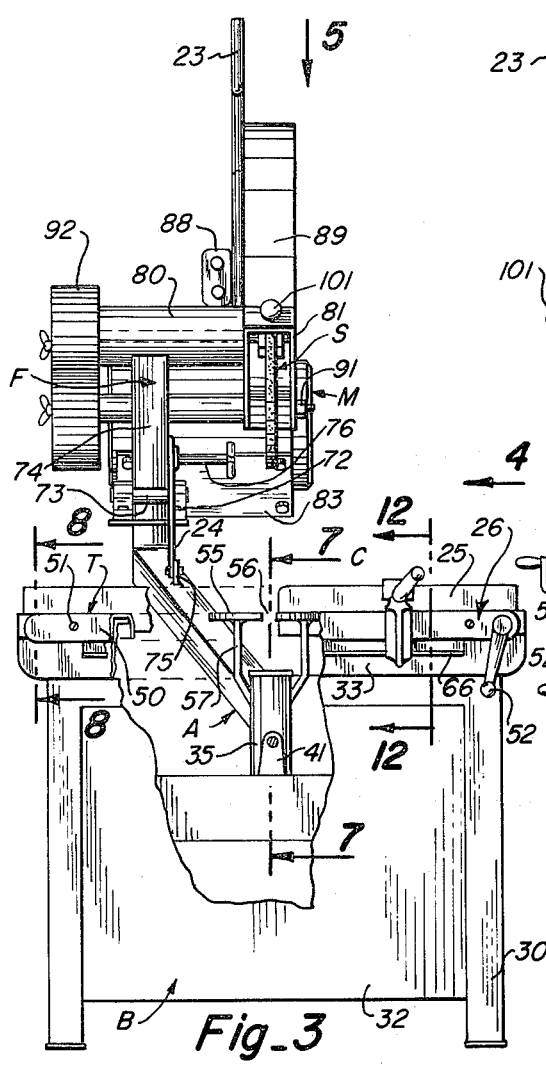
Fig_3
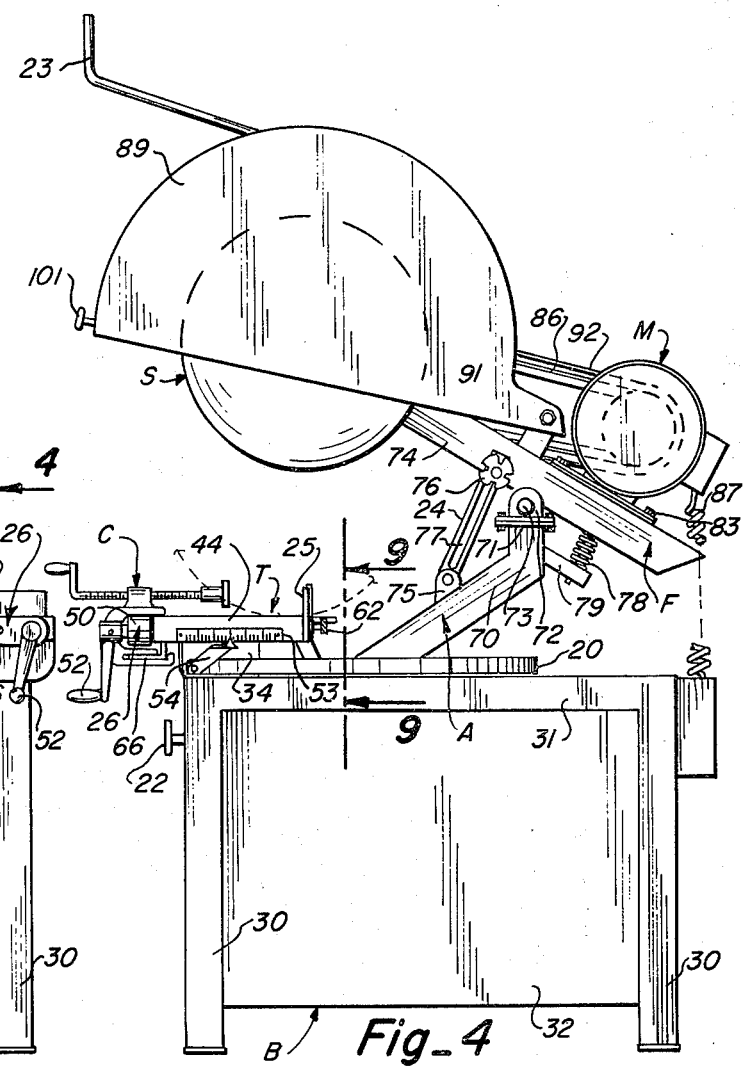
Fig_4
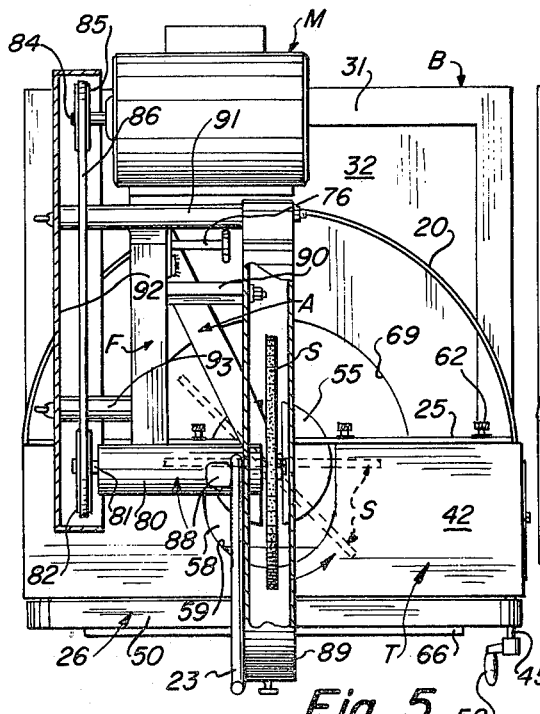
Fig_5
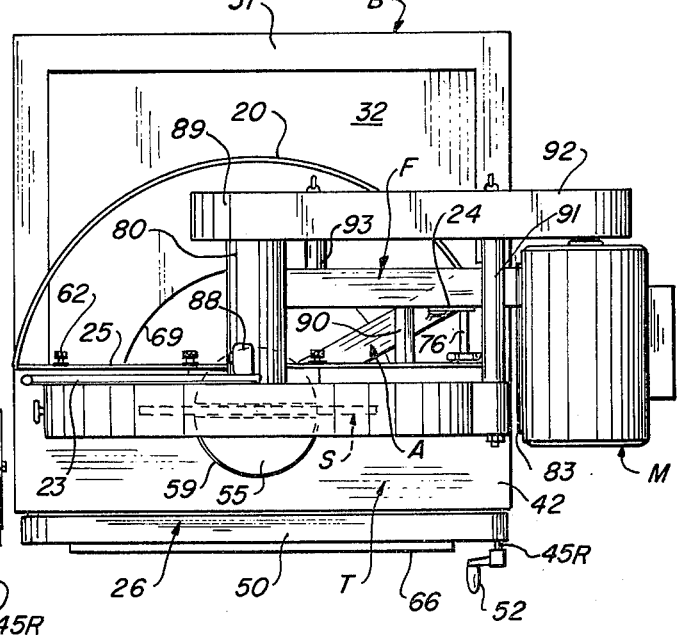
Fig_6

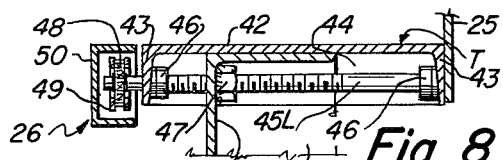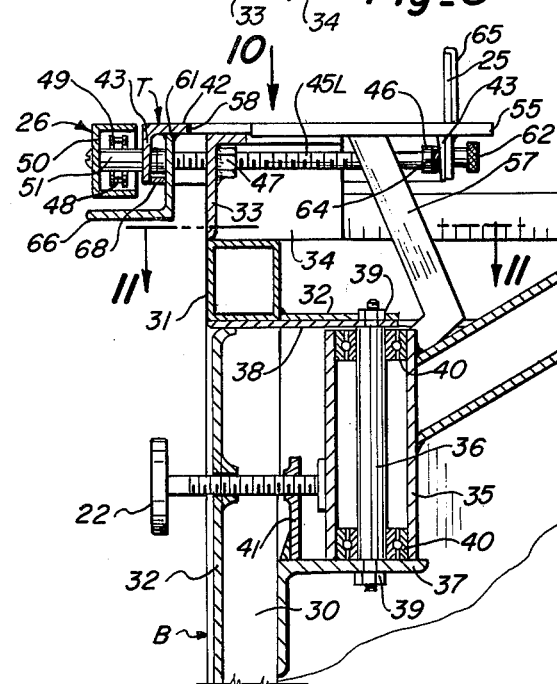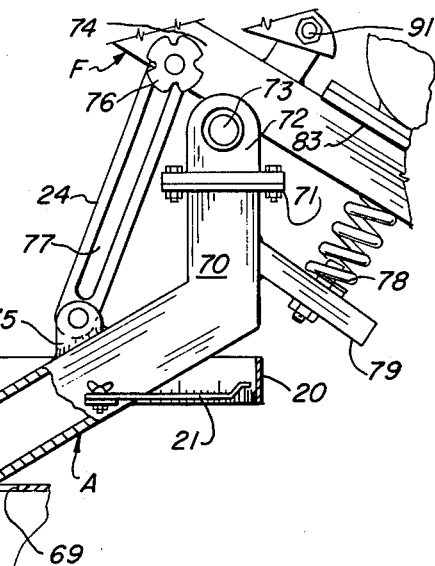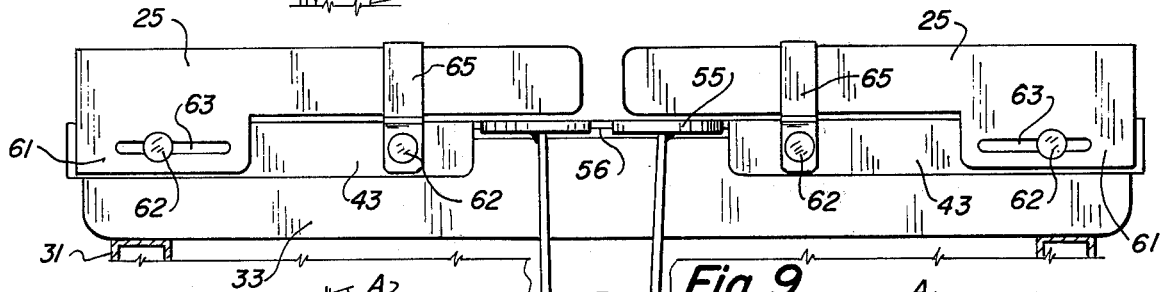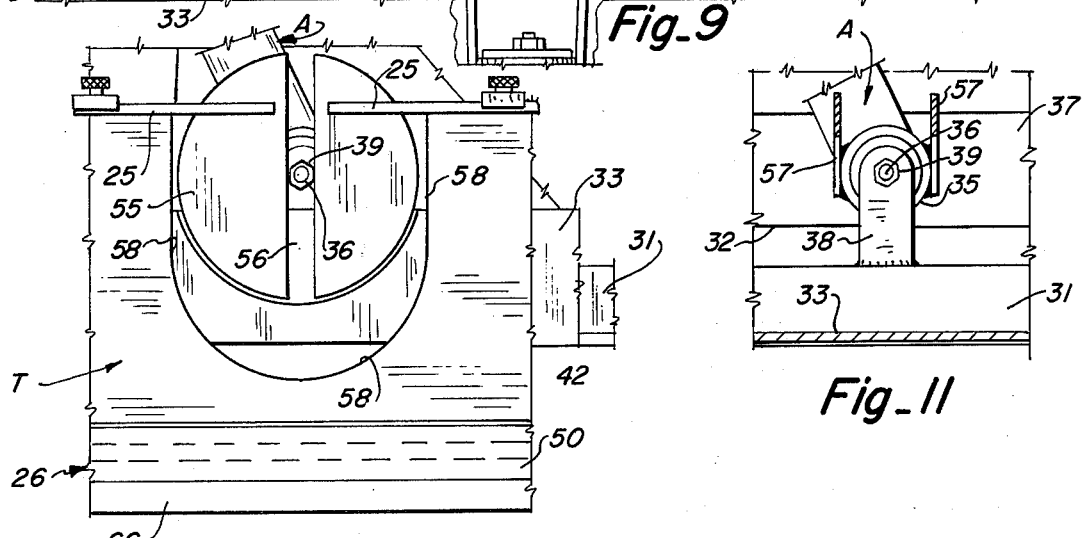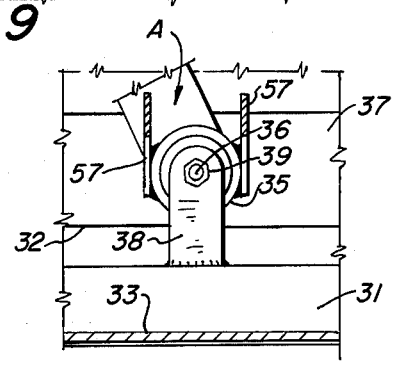

METAL SAW

The present invention relates to power saws, and more particularly to metal cutting power saws for cutting tubes, bars amd similar items. As such, the invention will be herinafter called a "Metal Saw", although it is to be understood that the saw may be used for other purposes.

The invention concerns specifically, the general class of saws which use disc blades of abrasive material, such as silicon carbide, and which are arranged with the disc blade being carried above a table whereon the metal tubes, bars or the like, the work pieces to be cut, are held. In such a saw, the shaft carrying the disc blade will be mounted upon a carrier, a tippable frame, which is ordinarily balanced for easy adjustment and setting over the table. A motor is also mounted upon this carrier frame and is operatively connected to the disc blade so that the blade may rapidly rotate as it cuts into a work piece.

Although conventional saws of this type are ordinarily rugged in their construction, they lack versatility in that they are used primarily for cross cutting a metal bar or a similar elongated work piece. Such saws are not always suitable for making accurate angle cuts and moreover, they are incapable of being effectively set for ripping operations where a workpiece is to be cut longitudinally.

The present invention was conceived and developed with such and other considerations in view and it comprises, in essence, a more versatile metal saw which may be mounted upon a bench. The saw blade and its motor are carried upon a tippable carrier frame with the blade being directly above a comparatively narrow table at the front of the bench. The carrier frame swings about a pivot underneath the table, with the disc blade intersecting the axis of this pivot. Thus, the blade will remain at one position upon the table regardless of the angle of cut the blade may make as the carrier frame is swung about the pivot. As a further feature, the carrier frame is offset to one side of the blade above the table. This permits the blade to be positioned for ripping with the carrier frame being at one side of the table.

It follows that a primary object of this invention is to provide a novel and improved metal cutting saw which is capable of either cross cutting, angle cutting or ripping metal tubes, bars and similar workpieces.

Another object of the invention is to provide a novel and improved metal cutting saw which may be set for ripping operations and in an arrangement capable of slotting elongated workpieces such as tubes to thereby eliminate conventional expensive milling operations, such as are ordinarily used for cutting slots in tubes and the like.

Another object of the invention is to provide a novel and improved metal cutting saw which is versatile and easy to operate either by lowering a disc blade upon a workpiece or by holding the blade at a fixed position and feeding the workpiece into it.

Another object of the invention is to provide a novel and improved metal cutting saw which is especially suitable for job shop work where many custom cuts are necessary, the improved saw capable of being quickly and easily set for various types of cuts.

Another object of the invention is to provide a novel and improved metal cutting saw which is a simple, rugged, economical unit capable of being operated over long periods of time with a minimum of maintenance expense.

With the foregoing and other objects in view, our present invention comprises certain constructions, combinations and arrangements of parts and elements as hereinafter described, defined in the appended claims and illustrated in preferred embodiment by the accompanying drawings in which:

FIG. 1 is a perspective view of the improved metal saw looking upon the saw and toward the front right side thereof and with a holding clamp on the table which is specially designed for the unit;

FIG. 2 is a fragmentary front elevation view of the upper portion of the saw bench and the table mounted upon the bench, as taken from the indicated arrow 2 at FIG. 1, but on an enlarged scale and with portions broken away to show parts otherwise hidden from view;

FIG. 3 is a front elevation view of the saw as shown at FIG. 1, but with portions of the bench and table broken away to show parts otherwise hidden from view, and within the table;

FIG. 4 is a right side elevation view of the saw, as taken from the indicated arrow 4 at FIG. 3;

FIG. 5 is a plan view of the saw as taken from the indicated arrow 5 at FIG. 3, but with the covers of the drive mechanism broken away to show parts otherwise hidden from view, and with broken lines showing alternate positions of the saw blade as it is swung to various angled positions;

FIG. 6 is a plan view similar to FIG. 5, but illustrating the saw as being turned 90° from the FIG. 5 position to place the same at a ripping position with respect to the table;

FIG. 7 is a fragmentary transverse action showing a portion of the bench structure, the table carried upon this bench, a pivot arm supported in its pivot underneath the table and a portion of the blade carrier frame held by this pivot arm, as taken substantially from the indicated line 7—7 at FIG. 3, but on an enlarged scale;

FIG. 8 is a fragmentary sectional view as taken from the indicated line 8—8 at FIG. 3, but on an enlarged scale;

FIG. 9 is a rear sectional elevation view, showing in full the back side of the table, as taken from the indicated line 9—9 at FIG. 4, but on an enlarged scale;

FIG. 10 is a fragmentary plan view of the center portion of the table as taken from the indicated arrow 10 at FIG. 7;

FIG. 11 is a fragmentary sectional detail of the center portion of the bench below the table to show the pivot arm as taken from the indicated line 11—11 at FIG. 7;

FIG. 12 is a side elevational view of the holding clamp per se, shown at FIGS. 1, 3 and 4, as taken from the indicated line 12—12 at FIG. 3, but on an enlarged scale, and with dashed lines indicating the outline of the table of the saw.

A preferred construction of a metal saw according to the present invention is shown at FIG. 1 of the drawings. A bench B upstands from a shop floor surface to provide a base whereon the apparatus may be carried. A holding table T, to hold workpieces, such as tubes and bars, is adjustably mounted across the front of this bench at a height which is convenient to a workman. This table T is preferably comparatively narrow and is elongated to lie across the front of the table to better receive elongated workpieces and permit them to extend from a side of the table. One or more clamps C may be provided for this table to assist in holding the workpieces in place. A saw blade S is mounted upon the forward end of a carrier frame F and a motor M is mounted upon the rear of the frame. This carrier frame F, in turn, is tippably mounted upon a swing arm A which is secured to a vertical pivot underneath the table. The swing arm A extends rearwardly and upwardly from this pivot, as shown.

A number of auxiliary features complete the organization shown at FIG. 1 as above described. A protractor 20 is mounted upon the bench behind the table to measure the swing of the arm A as by a pointer 21 attached to the arm. A clamp screw 22 in the front wall of the bench B engages the pivot of the swing arm A to secure the arm at any selected angle as in a manner hereinafter described. A hand lever 23 is affixed to the carrier frame to facilitate lowering the saw upon the table. A slide lock 24, between the arm and carrier frame F secures the blade at any selected height above the table. Fence sections 25 at the back of the table hold workpieces in place and these fence sections are shiftable to selected positions to clear the saw blade when the saw blade is swung at various angles. A table shifting mechanism 26 shifts the table T forwardly and rearwardly to properly locate a workpiece with respect to the saw blade S and is especially useful to vary the location of a ripping cut with respect to the edge of a workpiece held against the fence sections. These and other features are further described in detail to provide a better understanding of this embodiment of the invention.

Referring more particularly to the other figures of the drawings, the bench B, whereon this saw is mounted, may be any suitable shop unit which can include a support to carry a pivot structure of the swing arm A underneath the table T. Preferably, however, this bench is a simple metal structure with tubular legs 30, horizontal support rails 31 about the top of the unit and panels 32 to cover the sides and top of the frame formed by the legs 30 and rails 31. The table T will be at the front side of this bench and will be mounted upon a shelf angle 33 above the table. One leg of this angle 33 upstands from the front edge of the table and the other leg thereabove extends horizontally and rearwardly to support the shelf, as best shown in FIG. 7. A filler plate 34 closes at each end of this shelf angle 33, at each end of the bench to form a rigid structure.

The pivot at the base of the swing arm A includes a tubular shell 35 affixed to the base of the arm A. This shell is fitted upon a vertical pivot shaft 36 which is mounted upon, and upstands from, a ledge 37 formed by a structural angle extended between the front legs of the bench B, with one leg of the angle welded to the bench legs and the other leg forming the ledge 37, as shown at FIG. 7. The top of the pivot shaft 36 projects above the shell 35 and is secured in place by a strap 38 extending from the front horizontal support rail 31 to fit upon an end of the pivot shaft 36. This pivot shaft 36 is held in position by nuts 39 turned upon threaded ends of the shaft which extend through holes in the shelf 37 and strap 38, as illustrated. The tubular shell 35 is thus rotatably held by the pivot shaft 36 and is restrained upon the shaft in any suitable manner as by bearings 40. The clamp screw 22, heretofore described, extends through the front wall panel 32 and is carried in a threaded boss 41 upstanding from the ledge angle 37, and the clamp screw 22 is directed against the shell 35 to be tightened to press against this shell 35 to prevent it from rotating.

The table T is a flat, channel-shaped structure and it may be a conventional structural channel member whose web 42 forms the table surface resting upon the shelf angle 33. The flanges 43 of this channel are downturned to provide wall portions at the front and back of the table. Filler plates 44 at each end of this table extend between the flanges 43 to close the same to form a neat appearing, compact structure.

The undersurface of this web 42 is shiftably mounted upon the horizontal leg of the shelf angle 33 to shift forwardly and rearwardly with respect to the front wall of the bench. The shifting mechanism 26 includes a pair of threaded lead screws 45R and 45L which extend transversely between and through the table flanges 43 with a lead screw being located near each end of the table. These lead screws are held in place by bearings 46 at the table flanges as shown at FIG. 8. Each lead screw, 45R and 45L, extends through the vertical leg of the shelf angle 33 and through a threaded boss 47 on this angle, which may be a suitable nut welded to the angle leg. Accordingly, synchornous rotation of the lead screws 45R and 45L will shift the table forwardly or rearwardly with its front and rear edges remaining parallel with the front wall of the bench. To effect this synchronous shifting operation, the front end of each shaft 45R and 45L projects from the front flange of the table to carry a small sprocket 48 and a chain 49 extends between the sprockets on the respective shafts as best illustrated at FIG. 2.

This sprocket-chain arrangement outstanding from the front edge of the table is encased in a cover 50 which is held in place by suitable spacer bolts 51 as shown at FIGS. 2 and 7. The right hand lead screw 45R includes a shaft portion which extends beyond its sprocket 48 and through the cover 50 a short distance to carry a crank 52 to permit the lead screws 45R and 45L to be rotated for manually shifting the table. The position of the table T with respect to the bench B responsive to this shifting may be indicated by a scale 53 at the right filler plate 44 and a pointer 54, mounted upon the adjacent filler plate 34 of the shelf angle, as best illustrated at FIG. 4.

The saw blade S will be lowered upon this table at various angles with respect to the table and with the bottom of the circular blade being lowered below the table surface. To provide for this variable arrangement, the central portion of the table is partially cut away to provide a slot-like space for a circular guide plate 55. This guide plate is formed in two adjacent semi-circular pieces with a diametrical blade slot 56 between them. This permits the lower edge of the blade S to be lowered in this slot 56 to effect a complete cut of a workpiece placed upon the table. Accordingly, the guide plate 55 must rotate about the pivot shaft 36 as the swing arm A and the saw blade S are swung to different positions. The guide plate 55 is thus attached to the swing arm A as by supporting arms 57 extending upwardly from the shell 35 at the base of the arm A. A support arm 57 is connected to each portion of the guide plate 55 and each arm 57 is suitably angled to clear structural members of the bench such as the strap 38. Since the table T is shiftable forwardly and rearwardly upon the horizontal leg of the shelf angle 33, the slot-like space 58, cut in the table to clear the guide plate 55, is almost as wide as the table with a circular form 59 adjacent to the forward side of the table, and an opening at the back edge of the table, all as best illustrated at FIG. 10.

Two opposing fence sections 25 upstand from the rear edge of the channel-shaped table to hold workpieces in place and two sections 25 are required to provide a space 60 between them wherein the saw blade S may drop when it is lowered upon the table T. Since the saw blade is at the axis of the pivot shaft 36, it will remain above the table regardless of the angle at which a cut is to be made and accordingly, the fence sections must be shifted when the angle of a cut is changed. Each fence section 25 is thus formed with an outer portion, with respect to the center of the table, which includes a lower lobe 61 extending downwardly against the back flange 43 of the table. A thumb screw 62 extends through a slot 63 in this lobe into a threaded boss 64 in the table flange 43 as illustrated at FIGS. 7 and 9. The slot 63 permits adjustment of these sections.

The inner portion of each fence section 25 must remain above the surface of the table T to provide clearance for the guide plate 55 since this guide plate will be under the fence sections as illustrated at FIG. 10. Accordingly, the inner portion of each fence section is supported by a bracket 65 which is held in position on the table flange 43 by a thumb screw 62 as illustrated.

To complete the table structure, a lip 66 projects from underneath the front edge of the table T, a short distance below the gear cover 50 to support the clamp C as hereinafter described. This lip structure 66 may be formed by the leg of a structural angle. The other leg of the angle extends upwardly to the underside of the web of the channel 42 welded into place, as at 67, and is secured in position as by spacers 68 at the base of the front flange 43 as illustrated at FIG. 7.

The swing arm A is a square tubular member extending upwardly and rearwardly from pivot shell 35 as heretofore described. The top panel 32 of the bench B is suitably cut out, as at 69, to provide clearance for the swing arm A. The rearward portion of the swing arm A includes an upright leg 70, above the bench, to support a horizontal mounting plate 71. A pair of comparatively heavy bearings 72 are bolted to this mounting plate in a spaced apart arrangement to hold a trunnion shaft 73, secured to the carrier frame F, to permit the carrier frame to tip when the saw blade S is lowered upon the table. Accordingly, it is essential that the axis of these bearings 72 and of the trunnion shaft 73 be perpendicular to the plane of the blade S so that the circular saw blade will lie in the same vertical plane whenever it swings vertically about the axis of the bearing 72.

The axis of the pivot 36 supporting the swing arm A projects upwardly through the plane of the saw blade, as heretofore described. Thus, it is essential that the arm A be offset to one side of the plane of this blade at a suitable angle which may be approximately 30° to 40° to permit the arm A, the carrier frame F and the saw blade S to swing about the axis of pivot 36, as from a transverse cross cutting position of the saw blade, as shown at FIG. 5, to a parallel ripping position of the saw blade as shown at FIG. 6. In addition to this 90° swing in a clockwise direction and from a cross cut to a ripping position, the saw blade may also be swung for angle cuts, and preferably the range of swing will be clockwise 90° from the cross cut position and counterclockwise 45° from the cross cut position as indicated in broken lines at FIG. 5. FIGS. 5 and 6 emphasize the manner in which the swing arm A must be offset from the plane of the saw blade S, to support the carrier frame F at a corresponding offset position to effect these swinging movements.

The base 74 of the carrier frame F is formed as a square tubular member suitably proportioned to support the saw blade S at its front end and the motor M at its rear end. The trunnion shaft 73 is positioned therebetween at a location which permits the carrier frame to be in approximate balance at the trunnion but with an excess of weight at the back side to permit the carrier frame F to swing the saw blade S upwardly whenever it is released, but at the same time to permit an operator to swing the saw blade downwardly, by gripping the hand lever 23, with only a moderate effort. The lock slide 24, which will lock the carrier blade and saw to a given position with respect to the swing arm, is pivotally mounted upon an ear 79 on the swing arm A and a lock screw 76 extends through a slot 77 of this lock slide and into a threaded socket in the frame base 74 to secure the same in place whenever it is desired to use this slide. A spring 78 is mounted upon a lug 79 outstanding from the back side of the swing arm A with the spring extending upwardly therefrom to engage the carrier frame base 74 whenever the carrier frame swings upwardly beyond a limiting position. This spring thus prevents the carrier frame from stopping suddenly should an operator let go of the hand lever 23 when the saw is depressed.

The front end of the frame base 74 carries a tubular shell 80 in a T-shaped arrangement with respect to the base 74 and this shell houses suitable bearings to hold a saw shaft 81 having each end projecting from an end of the bearing. One end of this shaft 81 carries the saw blade S and the other end carries a pulley 82 as illustrated at FIG. 5. The opposite end of the frame base 74 carries a mounting plate 83 whereto the motor M is secured. The shaft 84 of the motor carries a pulley 85 which lies in the plane of pulley 83 and is operatively connected thereto by a belt 86. This motor M, an electric motor, is operated through circuit leads 87 which are not fully shown since they are entirely conventional. The circuit leads will extend to a conventional switching box 88 which may be mounted upon the frame bearing 81 adjacent to the hand lever 23, as best illustrated at FIG. 3.

The saw blade S, the pulleys 83 and 85 and the belt 86, the external moving parts in this appartus, are housed for protection of the saw operator. A hood 89 covers the upper portion of the saw blade S to protect an operator from flying sparks and to confine the saw blade should it accidentally explode. This hood is connected to the base 74 of the frame F by lugs 90 and 91 which outstand from the side of the base member 74. A cover 92 encloses the pulleys 83 and 85 and the belt 86 and this cover is held in position by lugs 91 and 93 as best illustrated at FIG. 5.

The clamp C illustrated at FIG. 12, is an auxiliary member adapted to be mounted upon the lip 66 which outstands below the table and is secured to the table as heretofore described. The clamp C is provided with a cast iron, comparatively heavy base 94 which is essentially C-shaped in form with a slotted lower section 95 to receive the lip 66, the slot including a hook 96 at its outer edge to securely fit against the rear corner of the lip 66 as in the manner clearly illustrated at FIG. 12. The upper portion of this C-shaped clamp base overreaches the cover 50 at the front of the table to lie upon the edge of the table. A threaded boss 97 upstands from this base 94 to carry a lead screw 98 which projects over the table T. This lead screw may thus be turned against a workpiece to secure the workpiece between it and the fence sections 25. Accordingly, the lead screw may carry a head 99 which will abut against a workpiece while the outer end of the lead screw will include a handle 100 to facilitate turning it to move against the workpiece.

The operation of the apparatus is manifest from the foregoing description. Whenever a transverse cut of metal is to be made, the workpiece is placed upon the table and secured in place by one or more clamps C. The motor M is started and the saw S is then lowered upon the workpiece by using the hand lever 23 or a gripping knob 101 at the front edge of the saw hood 89. If an angle cut is to be made, the clamp screw 22 is loosened to permit the swing arm A to swing to the selected angular position as indicated by the pointer 21 at the protractor 20. The clamp screw 22 is loosened to permit the swing arm A to swing to the selected angular position as indicated by the pointer 21 at the protractor 20. The clamp screw is then tightened to lock the swing arm in place, the fence sections 25 are shifted so that the space 60 between will be properly located with respect to the saw blade. It is to be noted that the swing arm A may be swung in either direction from the transverse cross-cut position to an angle of at least 45-degrees and also when the saw is swung clockwise, it may be swung a full 90-degrees to effect ripping operations and when in that position the location of a rip cut with respect to the edge of a workpiece can be adjusted by shifting the table T by turning the crank 52. In this respect, it is to be noted that the projection of the axis of the vertical pivot shaft 36, about which the swing arm swings, extends upwardly through the table to lie in the plane of the saw, and also to be near, if not at the center of the saw blade and near the axis of the saw shaft 81, as shown at FIG. 5.

The saw above described is especially suitable for cutting metal. However, it may also be used for other purposes, such as, for example, tile cutting, by changing the blade to a diamond saw, providing a source of water for the blade and by shielding the motor and other parts which cannot be wetted. Still other types of cutting operations may be used by minor modifications to the saw or the apparatus.

Accordingly, we have now described our invention in considerable detail. However, it is obvious that others skilled in the art can build and devise alternate and equivalent constructions which are nevertheless within the spirit and scope of our invention. Hence, we desire that our protection be limited not by the constructions illustrated and described, but only by the proper scope of the appended claims.

We claim:
1. A circular saw for cutting elongated, rod-like material square, or at any selected bevel angle, said saw and its mount being carried upon a fixed, bench-like base having a front edge which a workman will normally face when operating the saw and with the saw being disposed above the material to drop downwardly upon the material, and comprising, in combination therewith:
   a. an elongated, horizontally-disposed table to receive and hold the rod-like material to be cut by the saw with the longitudinal reach thereof paralleling and being adjacent to the front edge of the base;
   b. a swing arm mounted upon a vertical pivot carried on the base beneath the table, the vertical pivot axis thereof projecting through the table at a position where material on the table may be centered with respect to this axis and said arm extending rearwardly and upwardly therefrom to project behind and above the table to carry a horizontally disposed trunion shaft behind and above the table;
   c. a tippable frame mounted upon said trunion shaft to extend forwardly therefrom and over and above the table;
   d. a horizontal, powered, saw shaft on said frame positioned over the table and substantially at the projection of the vertical axis of the pivot, and with the aforesaid circular saw carried upon the shaft at a point intersecting the said projection of the vertical axis of the pivot whereby the saw is essentially centered at the extension of said vertical pivot axis above the table to permit the saw to drop downwardly and directly upon a piece of material on the table at the said pivot axis with the angle of the cut being selected by swinging the swing arm, and with the saw blade adapted to move a short distance below the table surface as it cuts through the piece of material;
   e. a cutout in the table about the vertical axis of the pivot having proportions slightly greater than the span of the portion of the blade moving below the table surface; and
   f. a horizontal, circular guide plate upstanding from the swing arm at the pivot axis and extended into the cutout and to the surface of the table with an axial center-slot therein to receive the portion of the blade which moves below the table surface, said saw and guide plate rotating together whenever the swing arm swings.

2. The organization defined in claim 1 wherein:
the tippable frame supporting the saw blade and the swing arm supporting the tippable frame are offset to one side of the plane of the saw blade a distance at least equal to the distance between the aforesaid pivot axis extending through the table and the longitudinal back edge of the table, at the side adjacent to the connection of the frame to the swing arm, whereby to permit the saw blade to be swung from a normal cross cut position perpendicular to the edge of the table to a ripping position over the table and parallel to the said back edge of the table with the swing arm and carrier frame being alongside the said back edge of the table.

3. The organization defined in claim 2 wherein:
the table is transversely shiftable from a limiting forward position to a limiting back position where the said back edge is extended toward the connection of the frame and swing arm, and
the frame and swing arm offset is proportioned to clear said back edge when the table is moved to its limiting back position and the swing arm is swung to place the saw blade at the aforesaid ripping position.

4. The organization defined in claim 1 wherein:
a fence is provided at the aforesaid back edge of the table to upstand from the table surface to hold an edge of a workpiece in place parallel with the table edge.

5. In the organization defined in claim 1, wherein:
the table is transversely shiftable from a limiting forward position to a limiting back position to shift a workpiece so that its position is substantially centered over the aforesaid vertical pivot; and wherein said cutout in the table is formed as a transverse slot to permit the table to shift transversely without interference by the guide plate.

* * * * *